(12) United States Patent
Hochhalter et al.

(10) Patent No.: US 7,482,717 B2
(45) Date of Patent: Jan. 27, 2009

(54) SERVO ACTUATOR WITH SELF POSITIONING ROTOR AND METHOD

(76) Inventors: Keith W. Hochhalter, 1515 Galloway Dr., Inverness, IL (US) 60010; Michael T. Seiler, 9521 68th St., Kenosha, WI (US) 53142

( * ) Notice: Subject to any disclaimer, the term of this patent is extended or adjusted under 35 U.S.C. 154(b) by 464 days.

(21) Appl. No.: 11/453,667

(22) Filed: Jun. 15, 2006

(65) Prior Publication Data
US 2007/0290556 A1 Dec. 20, 2007

(51) Int. Cl.
*H02K 41/00* (2006.01)
*H02K 7/06* (2006.01)

(52) U.S. Cl. .............. 310/12; 310/80; 318/135

(58) Field of Classification Search .......... 310/12, 310/80; 318/135
See application file for complete search history.

(56) References Cited

U.S. PATENT DOCUMENTS

| | | | |
|---|---|---|---|
| 6,223,971 B1 | 5/2001 | Sato | |
| 6,285,151 B1 * | 9/2001 | Wright et al. | 318/560 |
| 6,492,753 B2 | 12/2002 | Zepp et al. | |
| 6,555,941 B1 | 4/2003 | Zepp et al. | |
| 6,603,228 B1 | 8/2003 | Sato | |
| 6,844,647 B2 | 1/2005 | Horber | |
| 6,943,478 B2 | 9/2005 | Zepp | |
| 7,042,128 B2 | 5/2006 | Zepp et al. | |
| 2002/0109427 A1 * | 8/2002 | Hochhalter et al. | 310/89 |
| 2005/0253469 A1 | 11/2005 | Hochhalter et al. | |
| 2007/0290556 A1 * | 12/2007 | Hochhalter et al. | 310/12 |
| 2008/0258654 A1 * | 10/2008 | Neff | 318/1 |

* cited by examiner

*Primary Examiner*—James Harvey
(74) *Attorney, Agent, or Firm*—Meroni & Meroni, P.C.; Charles F. Meroni, Jr.; Christopher J. Scott (57) ABSTRACT

A linear actuator is provided with an integral permanent magnet, brushless motor capable of axial, self adjustment of the rotor position within the stator for field weakening. Axial displacement of the rotor within the stator allows for significantly improved speed performance from aligned rotor/stator components during light axial loading. Upon contact with a load, the screw and nut, as an integral part of the motor rotor, self align to fully engage within the stator for generation of high forces with minimal current. This axial shift can further be used as a high precision, low cost measure of the force applied for quality assurance purposes.

29 Claims, 4 Drawing Sheets

SERVO ACTUATOR WITH SELF POSITIONING ROTOR AND METHOD

BACKGROUND OF THE INVENTION

1. Field of the Invention

The present invention relates to an electrically powered linear actuator providing reciprocating, linear motion in applications with precise position and force requirements. More specifically it relates to an electrically powered linear actuator and certain methodology inherently taught thereby that addresses applications requiring high forces at moderate to low speeds to perform a specific operation, and high speeds at low forces at other portions of the cycle to quickly position and remove tooling. Typical applications include piercing, crimping, pressing, trimming, forming, flaring, clamping, bending, coining, marking, and riveting.

2. Description of Prior Art

Permanent magnet motors are typically limited in speed by the back electro-motive force (bemf) generated with respect to the available driving voltage. For this reason cycle times are often compromised due to less than desirable approach speeds. Additionally, extremely high currents are often required to deliver sufficient force, increasing both the cost and size of the motor windings and drive. It has been noted that many approaches have been taken to overcome speed limitations in permanent magnet motors through flux control or field weakening.

The most common approach to field weakening requires the drive to introduce an imposing field against the fixed excitation from the magnets. This is often achieved by injecting a non torque producing current to counteract the magnet flux. This approach is cumbersome and requires relatively high waste currents to be injected into a device where efficiency is important and heat dissipation is often a challenge. Another approach to field weakening of permanent magnet devices is through hybrid motor designs. Some of these include double salient, consequent pole, and a number of axial flux variations. There is a nearly endless variety of hybrid permanent magnet motor designs that exist to overcome the weakness of permanent magnet motors. Very few of these are in production due to various limitations, primarily in cost to manufacture.

A third approach to field weakening is by mechanical design. The primary approaches for mechanical field weakening include the use of an actuator to shift the rotor relative to the stator, and the use of centrifugal force to expand an external rotor with permanent magnets under high speed, increasing the radial air gap. The complexity of these devices is primarily due to the desire to overcome the limitations in permanent magnet motors for purely rotary applications. Much of this development is in an attempt to achieve constant horsepower at high speeds for electric or hybrid vehicles. Thus, the devices are usually intended only to supply torque with improved high speed performance. The approach of axially shifting the rotor relative to the stator requires a linear device to provide the motion. This adds significant cost and complexity to a rotary motor.

In the current invention the primary intent is to provide a device that provides linear motion rather than rotary motion. This device will utilize a traditional screw mechanism for converting rotary to linear motion. The device will also contain an integrated permanent magnet, brushless motor technology widely used today. The screw/nut will become an integral part of the rotor and rotor assembly, capable of axial motion in addition to the linear motion provided external to the device. This transition takes place automatically based on the load applied.

Without the ability to field weaken in applications requiring high forces/low speeds and high speeds/low forces motors and drives are larger than necessary, operate far from peak efficiency for the application, and are more costly than necessary. It is generally most desirable to minimize the current requirement from the drive necessary to generate the required force. The application throughput will dictate cycle time requirements, and hence linear travel motion profiles. Maximum speed requirements in combination with the screw lead and available supply voltages will establish the maximum motor voltage constant (Ke), and hence, the maximum motor torque constant (Kt).

Force requirements along with the established Kt will define current requirements of the motor and drive. Tradeoffs can be made between motor diameter, length, magnet type, number of winding turns and pattern, and generally the overall size and shape of the motor. In applications where high force/low speed and high speed/low force are required, operation does not take advantage of the peak horsepower capability of the typical permanent magnet motor. The back electromotive force (bemf) produced by the permanent magnets limit how high the Ke can go for a given available voltage. By limiting the Ke, the Kt is also limited. The lower that the Kt must be, the higher the current must be to produce a given force. At high forces these motors can be quite large to accommodate large diameter wire required in the windings. Motor costs, as well as drive costs, are typically high to supply the necessary currents.

What is needed, therefore, is a structural device or system that functions to limit the magnetic flux produced by the magnets at the time high speeds are required. This would allow the Ke, and hence, the Kt to increase and reduce current requirements, reducing component size and cost, decreasing energy consumption, and relieving the devices thermal dissipation requirements. In the current permanent magnet servo actuator this can be done through field weakening by allowing the rotor to shift at various positions within the stator.

It is desirable for the device to automatically shift between the high force and high speed states on demand. The high force or high speed should be able to be achieved at any point along the actuator for any length of stroke. In addition, many of the applications for this device include the need for force feedback for quality control purposes. By monitoring the position and force a detailed indication of the process/component quality is provided. The need for this force monitoring is often beyond that achieved through observing the applied current, since friction and many other system inefficiencies and tolerances influence the precision that can be obtained from purely monitoring current. Therefore, it is further desirable to integrate into the device a low cost, precise means of measuring the applied force without the need for a high cost force sensor and signal conditioner.

It is further noted that applications requiring linear motion for high force applications have traditionally used hydraulics or air over oil devices. While these devices provide high speeds and high forces their limitations are in that they are only capable of very crude positional, speed, and force control, they are very bulky systems, and due to the use of hydraulic fluid they can be very messy over time as seals wear and begin to leak.

In order to overcome these limitations electrically powered devices are replacing hydraulics in many applications. A wide variety of electrically powered linear actuators exist in prior art and in application dating back to the 1960's. These devices typically include a screw and nut to convert rotary motion from a motor to linear motion. The motor may be coupled to the end of the screw or built directly onto an extension of the screw shaft. Other configurations include motors that allow the screw to pass through the center of the motor rotor to shorten the overall package.

More recent patents and application publications set forth claims in which the screw nut or force application shaft are allowed to traverse axially within the rotor. For example, U.S. Pat. No. 6,223,971 discloses a nut and force application member that are smaller in diameter than the motor rotor such that the inner diameter of the rotor is used as a guide for the force application member. The screw is rotated with the nut held rotationally fixed. Another variation of this device is presented in U.S. Pat. No. 6,603,228 in which a brake is further disclosed. U.S. Patent Application Publication No. 2005/0253469 discloses structure for allowing the nut to pass axially within the rotor, the nut being rotationally fixed. The current invention does not intend to have a nut that passes within the rotor. The nut is allowed to rotate with the rotor, and hence the screw moves axially.

Many of these devices include the use of permanent magnet, brushless motors. These motors are the best suited motors for precision, linear reciprocating devices due to their high torque density, high efficiency, rapid dynamic response for precise position, velocity and force control, and limited maintenance. Permanent magnet, brushless motors have existed since the 1950's with many specific variations of these since that time. The intent of the current device is to utilize the most commonly available state of the art rotor and stator permanent magnet, brushless components, not otherwise made the subject of enforceable patent claims.

The prior art, however, perceives a need to overcome limitations that exist with linear devices that incorporate permanent magnet, brushless motors. Permanent magnet, brushless motors are typically limited in speed due to the back electromotive force (bemf) produced by the magnets. Reduction of this speed limitation or field weakening has been presented in numerous forms, however always presented with respect to a device with rotary output rather than linear. One particular approach to field weakening is by axially shifting the rotor within the stator. This particular approach is shown, for example, in U.S. Pat. Nos. 7,042,128; 6,943,478; 6,555,941; and 6,492,753. All of the noted devices produce a rotary output and require a linear actuator to shift the rotor.

The prior art thus perceives a need for a linear device having an automatically shifting rotor within a rotor-stator assembly for producing a wider range of torque speed operation. The current invention is a linear device that through driving of the linear device (i.e. by means of a screw/nut, into a substantial load change) the rotor is forced to automatically shift within the rotor-stator assembly, producing a wider range of torque speed operation than previously accomplished in devices with the rotor fixed axially with respect to the stator.

SUMMARY OF THE INVENTION

It is thus an object of the current invention to provide an electrically powered linear actuator and linear actuation methodology that address applications requiring (1) high forces at moderate to low speeds to perform a specific operation, and (2) high speeds at low forces at other portions of the cycle to quickly position and remove tooling. Typical applications of the foregoing include piercing, crimping, pressing, trimming, forming, flaring, clamping, bending, coining, marking, and riveting.

More specifically the current invention incorporates a field weakening technique that substantially expands the force and speed range capability from that currently available. This invention provides a means of field weakening that is "on demand" such that the device automatically shifts from a high speed mode of operation to a high force mode based on the applied load. By providing field weakening the overall package size can be significantly reduced. The top end speed is no longer limited by the driving voltage and bemf. The motor can be designed to have a substantially higher voltage constant than in traditional designs.

In doing this, the proportional torque constant is also higher, hence substantially reducing the current requirements at high forces. Reducing the current requirement allows for smaller and less costly motor components and amplifiers. Reduction of current losses greatly reduces losses in the motor windings characterized by the current squared times the winding resistance. Hence the motor runs cooler or the continuous operation can be elevated. The current invention effectively provides operating speeds that are twice those of current designs or will reduce current requirements for a given application by over 50 percent. The approach to field weakening set forth by the teachings of the present invention allow the rotor assembly to shift relative to the stator assembly as the screw driven member encounters loading.

It is a further object of the invention to leverage the shifting of the rotor assembly to supply a very precise, low cost, compact means of monitoring actual supplied force without the need for an expensive force sensor and signal conditioner. Many of the applications specified for this device require a means of monitoring actual delivered force relative to position for quality control purposes. Through a secondary spring resisting axially shift of the rotor assembly, a low cost, short stroke linear position sensor will provide the required force feedback.

It is yet a further object of the invention to present an alternate approach to linear actuator construction from existing extruded body designs. Typical linear actuators are constructed of extruded tubing with complex ends or heads that provide support for bearings, encoders, and guide mechanisms. These current designs are costly to produce, challenging to assemble, and offer only crude means for providing maintenance. The current invention utilizes a series of very simple plates, easily assembled. Through removal of a side cover, the entire actuator is exposed for maintenance such as re-lubrication of the entire screw/nut assembly.

Still further, it is an object of the present invention to provide a variation on the traditional radial air gap, permanent magnet, brushless motor. This design demonstrates how an axial air gap motor offers advantages to the radial air gap design. In this approach field weakening takes place through a substantially shorter travel of the rotor assembly.

BRIEF DESCRIPTION OF THE DRAWINGS

Other features of our invention will become more evident from a consideration of the following brief description of patent drawings.

DESCRIPTION OF THE PREFERRED EMBODIMENT(S)

Figure 1:
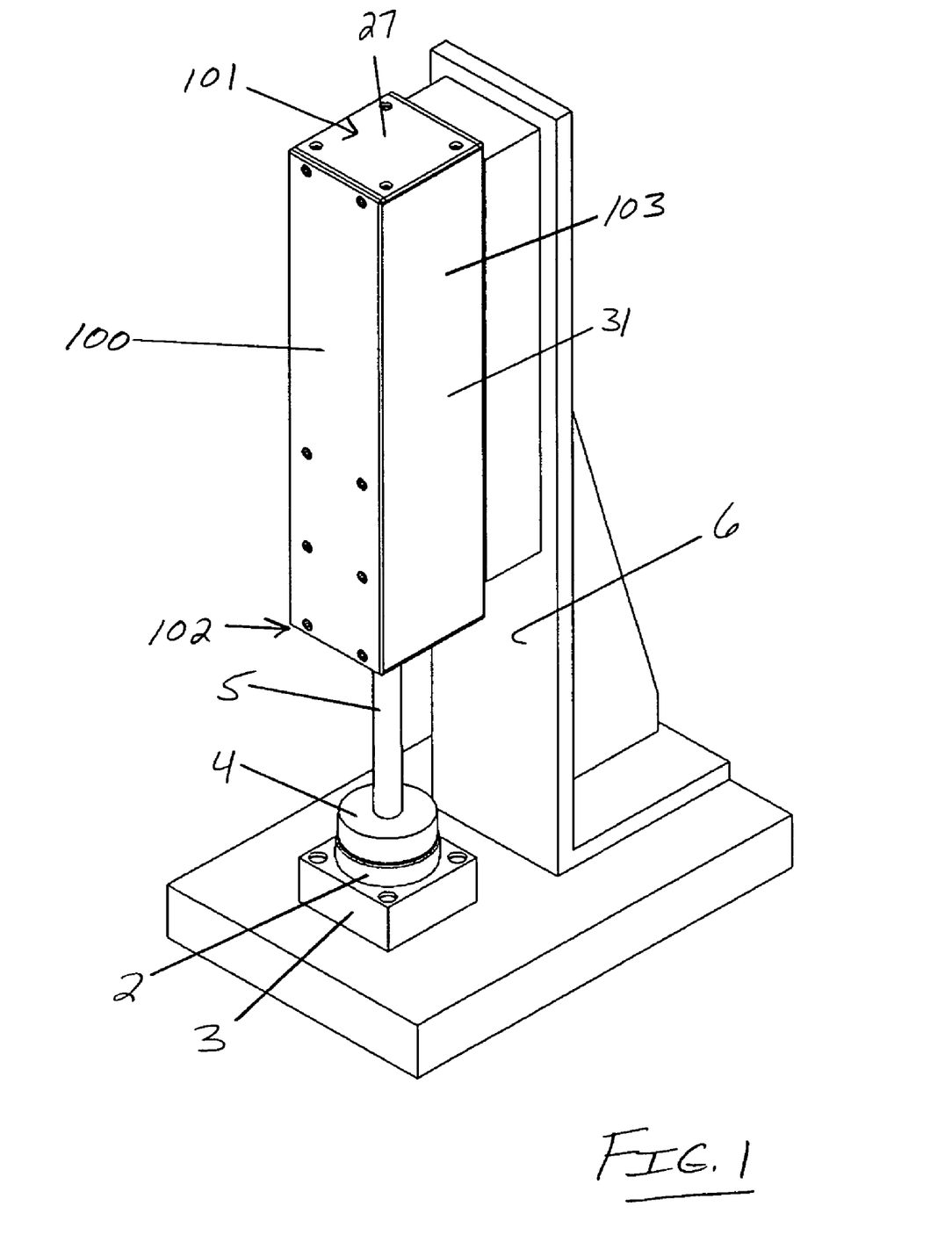
FIG. 1 is an isometric view of a typical bearing press utilizing a linear actuator per the current invention.

Referring now to the drawings, the preferred embodiment of the present invention generally concerns a servo actuator or linear actuator 100 intended for industrial applications including but not limited to piercing, crimping, pressing, trimming, forming, flaring, clamping, bending, coining, marking, and riveting. FIG. 1 shows a typical bearing press application. The linear actuator 100 of the current invention is shown extended to a point where a bearing 2 is initially being pressed into a receiving block 3. A bearing press tool 4 is directly attached to a screw thrust rod 5 of the linear actuator 100. A press frame 6 supports the linear actuator 100 relative to the pressing operation.

Referring to FIG. 1, it should be understood that the screw thrust rod 5 of linear actuator 100 would extend very rapidly until the bearing press tool 4 encountered loading generated by the resistance of pressing the bearing 2 into the bearing receiving block 3. The foregoing scenario may be said to define a certain high speed-low force portion of the actuating operation. Actual contact could take place at any point within the stroke limitations of the linear actuator 100. The actual press action would require axial shifting of the rotor axis to enable high output force during the entire press. The foregoing scenario may be said to define a certain low speed-high force portion of the actuating operation. Upon press completion the linear actuator 100 would begin to retract (via directed or governed commutation of the motor). Releasing of the load again shifts the rotor 12 of the linear actuator 100 into the high speed mode (high speed-low force) in order for the tool to be rapidly retracted such that an operator or robot could feed a new receiving block 3 and bearing 2 into the press. The preferred embodiment of the linear actuator 100 is generally illustrated and referenced in FIGS. 1-3, and the preferred rotor 12 is illustrated and referenced in FIGS. 2 and 3.

It should be prefatorily noted that in the following description of the actuator embodiments, the term "proximal" is used to refer to the direction which is toward the springs or the spring-end of the linear actuator 100 as generally referenced at proximal end 101 in FIGS. 1-3. Conversely, the term "distal" is used to reference a direction toward the end of the linear actuator 100 at which the linearly movable member or screw thrust rod 5 exits the housing 103. The distal end 102 and housing 103 are further referenced in FIGS. 1-3.

Figure 2:
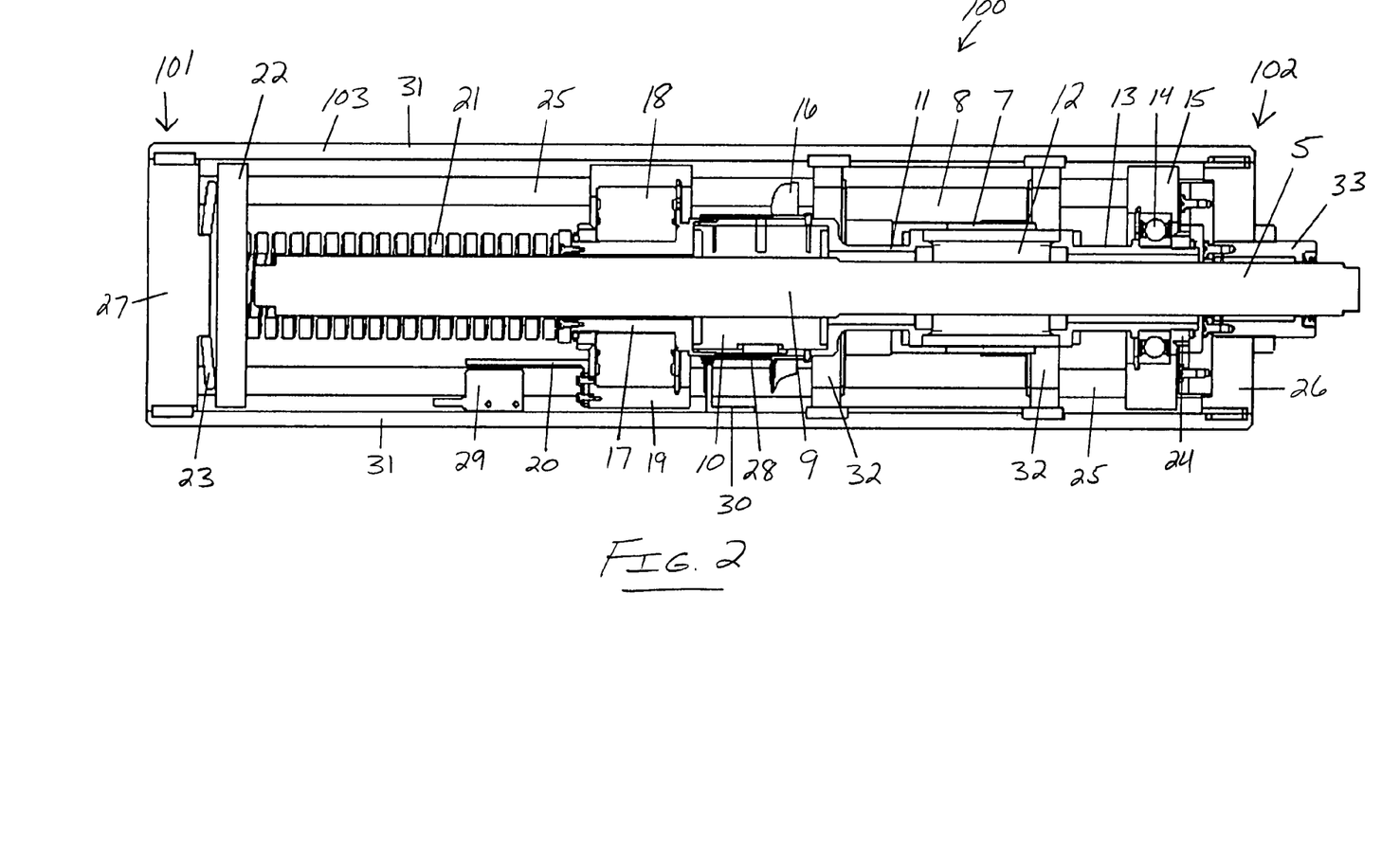
FIG. 2 is a longitudinal cross section of the linear actuator of the present invention showing the rotor assembly in the high speed position with the screw retracted and the rotor shifted forward.

FIG. 2 depicts a longitudinal cross section of the linear actuator 100 of the current invention. The device is generally shown in a retracted state with the rotor 12 shifted in distal position or toward distal end 102 and adjacent the distal end of the windings or stator assembly 8. FIG. 3, on the other hand, is a longitudinal cross section of the linear actuator 100 of the present invention showing the rotor 12 in the high force position with the screw thrust rod 5 extended and the rotor 12 aligned within the windings or stator assembly 8. From an inspection of FIG. 3, it will be seen that the rotor 12 is shifted proximally or toward proximal end 101 (the rotor 12 being substantially centered intermediate the proximal and distal ends of the stator assembly 8). Thus, it will be seen from a comparative inspection of FIGS. 2 and 3, that when the rotor assembly is in a retracted state with the rotor 12 shifted distally, said position represents a position of least flux coupling between the rotor magnets 7 and the windings or stator assembly 8. Conversely, when the rotor assembly is shifted proximally, the rotor 12 and rotor magnets 7 are centered within the stator assembly 8, and the device is in the high force position with maximum flux between the rotor 12 and stator assembly 8.

In the retracted, distally-shifted (low or zero load) rotor position, the magnetic field is weakened, the back electromotive force (bemf) has been reduced, and the linear actuator 100 is capable of very high speed (rotational motion to linear translation) displacements. The displacements are limited only by the structural limitations of the roller screw 9 (or threaded region), screw nut 10, and thrust bearing 18 relative to the application force and desired life as further illustrated and referenced in FIGS. 2 and 3. In the actuated, proximally-shifted rotor position, the magnetic field is strengthened (with increased bemf), and the linear actuator 100 is capable of high force (lower speed) displacements.

The linear actuator 100 may be properly described as comprising a rotor assembly and a housing assembly. The rotor assembly may be said to comprise all elements that shift under load to provide the described field weakening. In this regard, it is contemplated that the rotor assembly may be described as a sliding rotor assembly or an axially-displaceable rotor assembly. All housing assembly elements are fixed relative to mounting within the application.

The rotor assembly preferably comprises a primary drive screw 9 and certain shaft-displacing structure such as screw nut 10. Further, the rotor assembly preferably comprises a screw thrust rod 5, nut coupler 11, rotor 12, rotor magnets 7, radial bearing journal 13, radial bearing 14, radial bearing housing 15, fan 16, rotary encoder scale 28, thrust bearing journal 17, thrust bearing 18, thrust bearing housing 19, linear encoder scale 20, coil spring 21, rear sliding plate 22, and a force-sensing spring washer 23 all as illustrated and referenced in FIGS. 2 and 3. The preferred screw 9 is a roller screw with planetary rollers circulating with the nut 10. While planetary screws are capable of higher forces and preferred in typical applications for this device, ball screws would also be acceptable in some applications with limited cycle requirements or for lower forces.

The screw thrust rod 5 is an extension of the screw 9 and is essentially an unthreaded round shaft. The screw thrust rod 5 delivers the linear force to the load, external to the linear actuator housing 103. While the current invention prefers a transversely round shaft for purposes of a tight seal via the thrust rod scraper/seal 24 (as further illustrated and referenced in FIGS. 2 and 3), the transverse shaft shape could also be of another shape such as a square or hex, capable of providing internal anti-rotation of the screw 9. For purposes of addressing most applications of interest, external tooling will prohibit rotation of the screw 9.

The screw nut 10 is coupled to the rotor 12 by the nut coupler 11. Rotor magnets 7 are mounted on the outer diameter of the rotor 12. Rotation of the rotor 12, generated by power supplied to the stator assembly 8, rotates the screw nut 10, held axially fixed relative to the entire rotor assembly. Rotation of the screw nut 10 generates axial motion of the screw 9 and hence screw thrust rod 5, being rotationally fixed by external tooling. The rotor assembly is suspended in the linear actuator 100 at the distal end 102 by the radial bearing journal 13, radial bearing 14, and radial bearing housing 15.

At the proximal end 101, the rotor assembly is suspended by thrust bearing journal 17, thrust bearing 18, and thrust bearing housing 19. The radial bearing housing 15 and thrust bearing housing 19 are fixed axially with respect to each other, however are allowed to move axially on the guide shafts 25 that are rigidly attached between the front head 26 and the rear head 27 as further illustrated and referenced in FIGS. 2 and 3. Rear head 27 is further illustrated and referenced in FIG. 1. Not shown are linear bushings in the radial bearing housing 15, thrust bearing housing 19, and the rear plate 22, where they ride on two or more guide shafts 25.

The rotor assembly may thus be said to comprise elements 5, 14, 15, 13, 12, 7, 16, 28, 10, 9, 18, 19, 17, and 20 all of which are held in the distal position by the coil spring 21 and spring washer 23 until such time as forward motion of the screw 9 and screw thrust rod 5 allows the screw thrust rod 5 to encounter a load greater than that of the springs. At that time the distal end of the rotor assembly shifts toward the proximal end 101 of the linear actuator 100.

It is the intention of the current invention to operate in two fairly distinct locations, shifted fully toward the distal end 102 or very close to the proximal end 101. Forces required for the actual operation will far exceed those required to accelerate and move the tooling. Hence spring rates should be set to hold the distal end of the rotor 12 in the distal position at about 5-10% of the application force. Therefore the shift will take place over a very small range of applied force. While this is the primary intention, it would be possible to select a spring or multiple springs to allow a fairly continuous shift and approximate a constant horsepower output from the device at high speeds.

With completion of compression of the coil spring 21, set by an adjustable stop, force is built rapidly as the screw attempts to advance the nut 10 and hence screw thrust rod 5 into the load. Continuous build up of force against the rear plate 22 compresses the spring washer 23 against the rear head 27. The spring washer 23 is selected to provide only minimal movement of the rotor assembly with high forces. This positional change will likely only amount to about 0.100 inches or a distance that the rotor 12 can shift within the stator assembly 8 to produce only very minimal change in output force capability. By allowing the further movement of the rotor assembly, it is contemplated that an optional linear encoder read head 29 in conjunction with the linear encoder scale 20 may effectively function to provide a precise means for determining the actual applied force. Determining the force by this means is much more precise that depending on applied current due to device losses and tolerances. It is also 10 to 20 times more cost effective than a force gauge and signal conditioner and typically more precise.

The rotary encoder reader 30 in conjunction with the rotary encoder scale 28 provide rotary position information for commutation of the motor and overall positioning. Since the device operates in essentially two discrete positions the linear encoder reader 29 and linear encoder scale 20 are not required to command a destination position or indicate the final position. However using the rotary and linear encoder in conjunction a final position and force can be achieved by subtracting the two positions. The rotary encoder scale 28 is proposed as a device that can be extended in length such that as the linear position of the rotor assembly changes the rotary encoder reader can remain fixed and read rotary position of the entire shift.

The housing assembly may be said to preferably comprise guide shafts 25, stator assembly 8, side plates 31, cover plates (one of which is generally depicted in FIG. 1), stator mounting blocks 32, front head 26, rear plate 27, linear encoder reader 29, rotary encoder reader 30, wiper/scraper 24, and certain shift adjustment means as referenced at structure 33. The stator mounting blocks 32 are rigidly fixed to the two side plates 31. The side plates 31 and two or more guide shafts 25 are fixed to the front head 26 and the rear head 27. Two covers are removably fastened to the heads 26 and 27 and side plates 31. The shift adjustment means 33 may be threaded and locked to the front head 26 and function to establish the maximum shift of the rotor assembly during high speeds. It may be desirable to have this adjustment since shift of the rotor 12 is a compromise between the highest achievable speed and force available at this speed.

Figure 3:
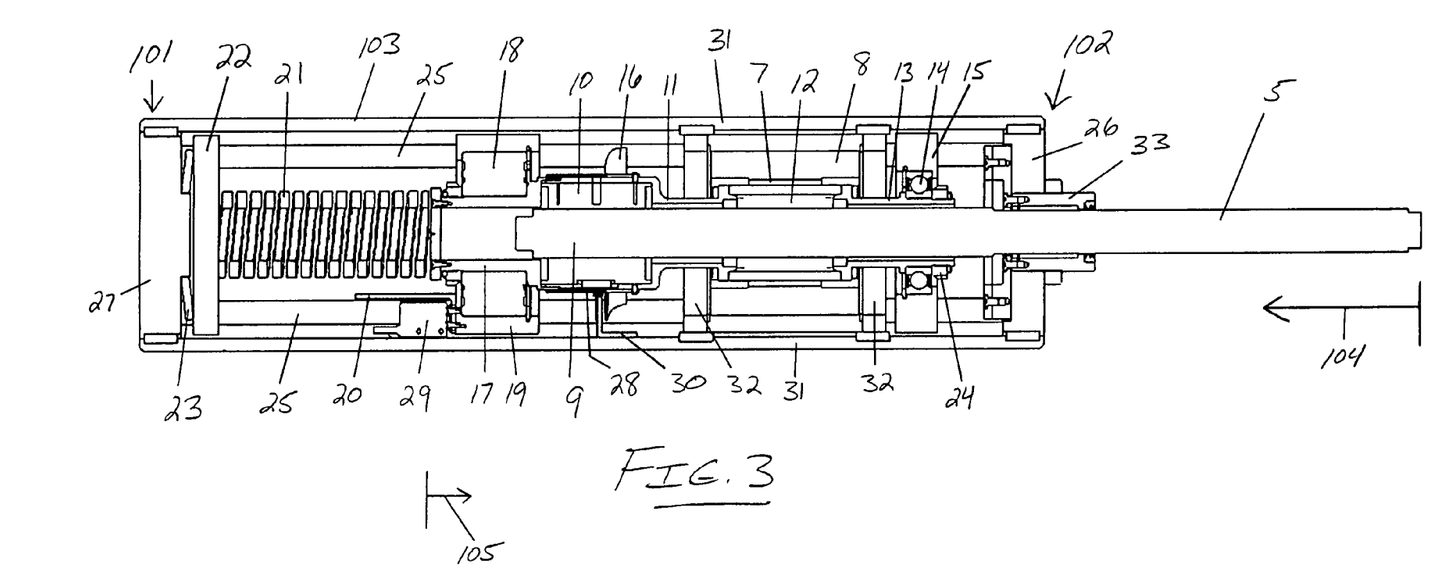
FIG. 3 is a longitudinal cross section of the linear actuator of the present invention showing the rotor assembly in the high force position with the screw extended and the rotor aligned within the stator.

It will be recalled that FIG. 3 shows the screw thrust rod 5 and screw 9 shifted toward the distal end relative to the nut 10. It is assumed in this drawing that the screw thrust rod 5 encountered a load as referenced at vector arrow 104. This load 104 was greater than the force provided by the coil spring 21 (as referenced at relatively shorter vector arrow 105), hence shifting the rotor assembly toward the proximal end 101 on the guide shafts 25. The rotor 12 and rotor magnets 7 thus tend to displace and center within the stator assembly 8, and the device is in the high force position with maximum flux between the rotor 12 and stator 8.

Figure 4:
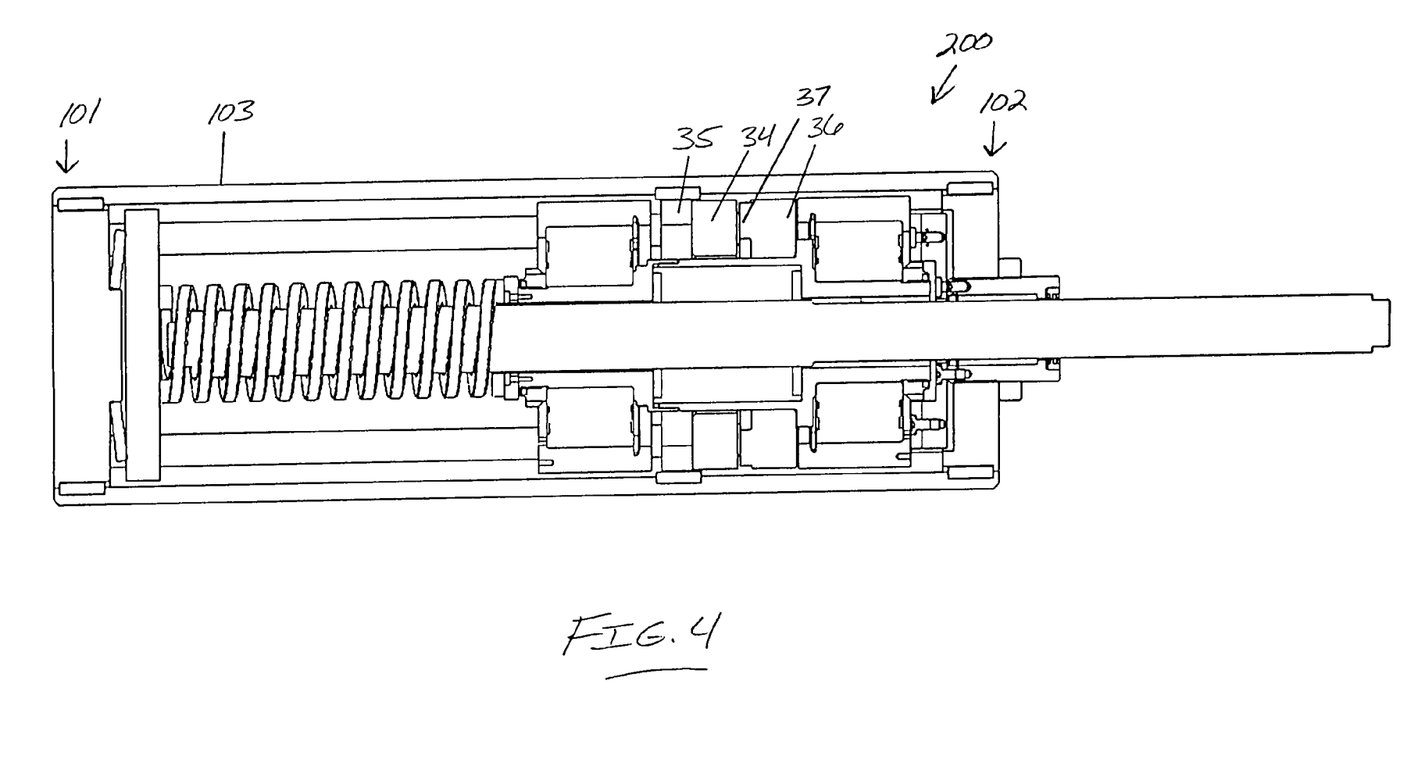
FIG. 4 is a longitudinal cross section of the linear actuator of the present invention showing an axial air gap motor with the rotor assembly in the high speed position.

FIG. 4 depicts an alternative embodiment of the present invention and thus may be said to depict alternative linear actuator 200 comprising a permanent magnet motor configuration where the rotor-stator air gap is axially aligned between the rotor 36 and stator 34 versus radially aligned as presented in FIGS. 2 and 3. While similar in concept to that of FIGS. 2 and 3, the motor components are different. Rather than an elongated stator 8 as in FIGS. 2 and 3, the stator 34 of alternative linear actuator 200 may be fixed only on one end via the stator mounting plate 35. The rotor 36 is attached to the axially movable rotor assembly on only one end. The rotor magnets 37 are fixed to the rotor 36 in the axial direction rather than radially (as in FIGS. 2 and 3). The advantage of this approach is that the shift required by the rotor assembly is very small in comparison with the shift required by the rotor assembly shown in FIGS. 2 and 3. The disadvantages are that motor diameters can be significantly large in an axial air gap motor as compared to radial air gap motors to produce sufficient torque. Also with the smaller air gap(s), component tolerances for aligning the air gap become very critical.

While the above description contains much specificity, this specificity should not be construed as limitations on the scope of the invention, but rather as an exemplification of the invention. For example, it is contemplated that a second alternative embodiment of the present invention essentially concerns an electrically-powered linear actuator assembly, the linear actuator assembly comprising a housing, a thrust assembly (comprising a screw thrust rod and a screw nut), a commutatable motor assembly (comprising a stator assembly and a rotor assembly), and certain rotor-position-encoding means or certain rotor-displacement-governing means. In this regard, it is contemplated that certain (rotor) displacement-governing means may effectively function to govern rotor displacement intermediate the first and second rotor displacement positions and further direct stator commutation based upon the rotor displacement positions.

The housing essentially comprises a proximal housing end 101, a distal housing end 102, and a longitudinal housing axis, the housing axis extending intermediate the proximal and distal housing ends. The thrust assembly essentially comprises an externally threaded screw shaft 9, an internally threaded nut 10, and a nut axis of rotation extending axially through the screw shaft 9. The nut 10 is threadably received upon the screw shaft 9 and is rotatable about the nut axis of rotation for axially displacing the screw shaft 9 relative to the nut 10. The screw shaft 9 is thus axially displaceable intermediate a retracted, fully-relaxed position as generally depicted in FIG. 2 and an actuated, loaded position as generally depicted in FIG. 3.

The commutatable motor assembly essentially comprises a rotor assembly (for example, comprising rotor 12 and rotor magnets 7), a stator assembly (such as stator assembly 8), a rotor-stator air gap, and a longitudinal motor axis. The motor axis is preferably collinear with the nut axis of rotation. The stator assembly inherently comprises a proximal stator end and a distal stator end and the rotor assembly inherently comprises a proximal rotor end and a distal rotor end. The rotor assembly is preferably coupled to the nut 10 at the proximal rotor end for imparting rotational motion thereto.

The stator assembly is preferably axially fixed relative to the housing axis, and the rotor assembly is preferably axially displaceable relative to the stator assembly along the motor axis for automatically adjusting the back electromotive force therebetween. The proximal and distal rotor ends are generally displaceable intermediate the proximal and distal stator ends. The automatically adjustable back electromotive force enables high speed-low force shaft displacement adjacent the relaxed position (at a force-weakened rotor-stator position) and further enables low speed-high force shaft displacement adjacent the loaded position (at a force-strengthened rotor-stator position). The rotor-position-encoding means, as may be defined by the rotary encoder assembly and/or linear encoder assembly, functions to sense rotor assembly position and thereby function to further govern commutation of the motor assembly.

Stated another way, the linear actuator may be said to disclose an electrically-powered linear actuator assembly comprising a housing assembly and an axially displaceable rotor assembly. When so described, the housing assembly may be said to comprise a proximal housing end, a distal housing end, a longitudinal housing axis, and an axially fixed, commutatable stator assembly, the housing axis extending intermediate the proximal and distal housing ends.

The rotor assembly may be said to comprise a screw shaft, a shaft-displacing nut, a rotor, and an axis of rotation. The nut is threadably received upon the screw shaft and rotatable about the axis of rotation for axially displacing the screw shaft relative to the nut. The rotor is coupled to the nut for imparting rotational motion thereto, and is axially displaceable radially inward relative to the stator intermediate a first, maximally-distal rotor displacement position and a second, maximally-proximal rotor displacement position for effectively varying the back electromotive force therebetween. The maximally distal rotor displacement position enables higher speed-lower force shaft displacement adjacent a relaxed actuator position and the maximally proximal rotor displacement position (as centered intermediate the distal and proximal stator ends) enables lower speed-higher force shaft displacement adjacent a loaded actuator position.

Central to the invention is the rotor-stator assembly for effective use in a linear actuator. The rotor-stator assembly comprises an axially-fixed stator and an axially-displaceable rotor. The stator having a first stator end, a second stator end, and a longitudinal stator axis extending intermediate the stator ends. The rotor essentially comprises an axis of rotation and is cooperable intermediate the stator and a shaft-displacing structure (such as a nut or screw shaft) for imparting rotational motion to the shaft-displacing structure. In this regard, it is noted that an alternative approach to the rotor assembly configuration presented could be practiced so that the rotor 12 is coupled to the screw rather than to the nut 10. In other words, rotation of the rotor would rotate the screw instead of the nut. The screw would be fixed axially and contained by the thrust bearing housing 19. The nut 10 would be attached to a thrust tube member that would extend external to the actuator and be attached to the external tooling. The nut would be held from rotating by an internal means or by the tooling. Rotation of the nut, and hence screw, would position the nut and thrust tube axially. Thus, it is contemplated that certain shaft-displacing structure could be defined by a screw and/or a nut as per the election of the manufacturer and the application requirements.

The rotor is axially displaceable along the stator axis intermediate a first rotor displacement position and a second rotor displacement position essentially for varying the back electromotive force intermediate the stator and the rotor. The first rotor displacement position functions to enable higher speed-lower force axial shaft displacement within a linear actuator, and the second rotor displacement position functions to enable lower speed-higher force axial shaft displacement within a linear actuator.

The linear actuator assembly preferably comprises at least one spring member or certain compressive spring means or certain displacement-governing means. Each spring member may be preferably positioned adjacent the proximal housing end for governing axial rotor assembly displacement relative to the stator assembly. The spring members may be preferably defined by a compression coil spring member and a washer spring member. The compression coil spring member and the washer spring member compress when in the loaded position for governing the axial rotor displacement relative to the stator assembly. The rotor assembly is preferably axially positioned intermediate the proximal and distal stator ends when in the loaded position.

The linear actuator assembly may further comprise certain spring-position-encoding means such as a linear encoder assembly, which spring-positioning-encoding means are cooperable with the washer spring member for precisely determining actual applied force. In this last regard, it is contemplated that the rotor-position-encoding means and the spring-position-encoding means may be cooperable for determining a final rotor position and a final applied force. The axial displacement intermediate the rotary and linear encoder may function to determine the final rotor position and the final applied force. Notably, a reader of the rotary encoder may be extendable in length such that as the axial position of the rotor assembly changes, the reader can remain axially fixed and read rotary position of an entire axial shift.

The linear actuator assembly may further comprise certain rotor assembly shift adjustment means, the shift adjustment means for adjusting maximal distally-directed rotor assembly displacement. The rotor-stator air gap may be selected to be radial or axial depending on the application requirements. It is contemplated that the radial rotor-stator air gap may function to maximize rotor assembly displacement and be utilized in relatively wide force tolerance applications. Conversely, an axial rotor-stator air gap may be incorporated into the design for minimizing rotor assembly displacement, and for relatively narrow force tolerance applications.

It is also notable that the coil spring could be replaced with a pneumatic cylinder (i.e. certain displacement-governing means) and the essence of the invention would still be practicable. In this regard, it is contemplated that the cylinder would provide a constant force, shifting the rotor assembly to the distal end. At a specific applied load, the pneumatic cylinder would collapse and the rotor assembly would advance to the proximal end, aligning the rotor with the stator for high force operation.

It is further contemplated that the disclosed concepts teach a certain actuation method for a linear actuator. Essentially, it is contemplated that the actuation method may comprise certain steps or processes. Starting from a relaxed position, the method may be said to comprise initial steps of axially offsetting a rotor assembly relative to a stator assembly and relaxing the thrust member while axially offsetting the rotor assembly relative to the stator assembly. By so axially offsetting the rotor assembly relative to the stator assembly, the operator minimizes back electromotive forces intermediate the rotor and stator assemblies for enabling higher speed-lower force linear actuation. In this way, the operator may then axially extend the thrust rod (with higher speed-lower force) before loading the thrust member. Under a load, the operator may then govern axial rotor assembly displacement. By so loading under governed displacement, the operator may effectively axially center the rotor assembly relative to the stator assembly for maximizing back electromotive forces intermediate the rotor and stator assemblies, which effect further enables lower speed-higher force linear actuation (required or effective for loaded linear actuation. The process may thus repeat by axially retracting the thrust rod before relaxing the thrust member.

Accordingly, although the invention has been described by reference to certain preferred and alternative embodiments, it is not intended that the novel disclosures herein presented be limited thereby, but that modifications thereof are intended to be included as falling within the broad scope and spirit of the foregoing disclosure, the following claims and the appended drawings.

We claim:

1. An electrically-powered linear actuator assembly, the linear actuator assembly comprising:
   a housing, the housing having a first housing end, a second housing end, and a longitudinal housing axis, the housing axis extending intermediate the first and second housing ends;
   a thrust assembly, the thrust assembly comprising a screw shaft, a nut, and a nut axis of rotation, the nut being threadably received upon the screw shaft and rotatable about the nut axis of rotation for axially displacing the screw shaft relative to the nut, the screw shaft being axially displaceable intermediate a retracted, relaxed position and an actuated, loaded position;
   a commutatable motor assembly, the motor assembly comprising a rotor assembly, a stator assembly, and a longitudinal motor axis, the motor axis being collinear with the nut axis of rotation, the rotor assembly being coupled to the nut for imparting rotational motion thereto, the stator assembly being axially fixed relative to the housing axis, the rotor assembly being axially displaceable relative to the stator assembly along the motor axis for automatically varying the back electromotive force therebetween, the variable back electromotive force for enabling high speed-low force shaft displacement adjacent the relaxed position and for enabling low speed-high force shaft displacement adjacent the loaded position; and
   rotor-position-encoding means, the rotor-position-encoding means for sensing rotor assembly position and governing motor assembly commutation.

2. The linear actuator assembly of claim 1 comprising at least one spring member, each spring member being positioned adjacent the first housing end for governing axial rotor assembly displacement relative to the stator assembly.

3. The linear actuator assembly of claim 2 comprising a compression coil spring member and a washer spring member, the compression coil spring member and the washer spring member being compressible when in the loaded position for governing axial rotor assembly displacement.

4. The linear actuator assembly of claim 2 comprising spring-position-encoding means, the spring-positioning-encoding means being cooperable with a select spring member for precisely determining actual applied force.

5. The linear actuator assembly of claim 4 wherein the rotor-position-encoding means and the spring-position-encoding means are cooperable for determining a final rotor position and a final applied force.

6. The linear actuator of claim 5 wherein the rotor-position-encoding means are defined by a rotary encoder and the spring-position-encoding means are defined by linear encoder, the axial displacement intermediate the rotary and linear encoder for determining the final rotor position and the final applied force.

7. The linear actuator of claim 6 wherein the rotary encoder comprises a reader, the rotary encoder being extendable in length such that as the axial position of the rotor assembly changes, the reader remains axially fixed and reads rotary position of an entire axial shift.

8. The linear actuator assembly of claim 1 comprising rotor assembly shift adjustment means, the shift adjustment means for adjusting maximal rotor assembly displacement.

9. The linear actuator assembly of claim 1 comprising a radial rotor-stator air gap, the radial rotor-stator air gap for maximizing rotor assembly displacement, the linear actuator assembly for use in wide force tolerance applications.

10. The linear actuator assembly of claim 1 comprising an axial rotor-stator air gap, the axial rotor-stator air gap for minimizing rotor assembly displacement, the linear actuator assembly for use in narrow force tolerance applications.

11. An electrically-powered linear actuator assembly, the linear actuator assembly comprising:
    a housing assembly, the housing assembly having a first housing end, a second housing end, a longitudinal housing axis, and an axially fixed, commutable stator assembly, the housing axis extending intermediate the first and second housing ends;
    an axially-displaceable rotor assembly, the rotor assembly comprising a screw shaft, a shaft-displacing nut, a rotor, and an axis of rotation, the nut being threadably received upon the screw shaft and rotatable about the axis of rotation for axially displacing the screw shaft relative to the nut, the rotor being coupled to the nut for imparting rotational motion thereto, the rotor being axially displaceable intermediate first and second rotor displacement positions for varying the back electromotive force therebetween, the first rotor displacement position for enabling higher speed-lower force shaft displacement adjacent a relaxed actuator position, the second rotor displacement position for enabling lower speed-higher force shaft displacement adjacent a loaded actuator position; and
    rotor-position-encoding means, the rotor-position-encoding means for sensing rotor position relative to the stator assembly and governing stator assembly commutation.

12. The linear actuator assembly of claim 11 comprising displacement-governing means, the displacement-governing means being positioned intermediate the first housing end and the rotor assembly for governing rotor assembly displacement relative to the stator assembly.

13. The linear actuator assembly of claim 12 wherein the displacement-governing means are defined by at least one select structure, the select structure being selected from the group consisting of a compression coil, a spring washer, and a pneumatic cylinder, the compression coil or the pneumatic cylinder for governing rotor displacement when in a loaded position, a compression coil-spring washer combination or a pneumatic cylinder-spring washer combination for governing rotor displacement when in a fully-loaded position.

14. The linear actuator assembly of claim 12 comprising spring-position-encoding means, the spring-positioning-encoding means being cooperable with the compressive spring means for precisely determining actual applied force.

15. The linear actuator assembly of claim 14 wherein the rotor-position-encoding means and the spring-position-encoding means are cooperable for determining a final rotor position and a final applied force.

16. The linear actuator of claim 15 wherein the rotor-position-encoding means are defined by a rotary encoder and the spring-position-encoding means are defined by linear encoder, the axial displacement intermediate the rotary and linear encoder for determining the final rotor position and the final applied force.

17. The linear actuator of claim 16 wherein the rotary encoder comprises a reader, the rotary encoder being extendable in length such that as the axial position of the rotor assembly changes the reader remains axially fixed and reads rotary position of an entire axial shift.

18. The linear actuator assembly of claim 11 comprising rotor shift adjustment means, the shift adjustment means for adjusting maximal rotor assembly displacement.

19. The linear actuator assembly of claim 11 comprising a radial rotor-stator air gap, the radial rotor-stator air gap for maximizing rotor assembly displacement, the linear actuator assembly for use in wide force tolerance applications.

20. The linear actuator assembly of claim 11 comprising an axial rotor-stator air gap, the axial rotor-stator air gap for minimizing rotor assembly displacement, the linear actuator assembly for use in narrow force tolerance applications.

21. A rotor-stator assembly, the rotor-stator assembly for use in an electrically-powered linear actuator assembly, the rotor-stator assembly comprising:
an axially-fixed stator, the stator having first and second stator ends and a longitudinal stator axis extending intermediate therebetween;
an axially-displaceable rotor, the rotor being cooperable intermediate the stator and a shaft-displacing structure for imparting rotational motion to the shaft-displacing structure, the rotor being axially displaceable along the stator axis intermediate first and second rotor displacement positions for varying the back electromotive force intermediate the stator and the rotor, the first rotor displacement position for enabling higher speed-lower force axial displacement in a linear actuator, the second rotor displacement position for enabling lower speed-higher force axial displacement in the linear actuator.

22. The rotor-stator assembly of claim 21 comprising displacement-governing means, the displacement-governing means for governing rotor displacement intermediate the first and second rotor displacement positions.

23. The rotor-stator assembly of claim 22 wherein the displacement-governing means direct stator commutation based upon the rotor displacement positions.

24. The rotor-stator assembly of claim 21 comprising rotor shift adjustment means, the shift adjustment means for enabling a user to selectively adjust maximal rotor displacements.

25. An actuation method for a linear actuator, the actuation method comprising the steps of:
axially offsetting a rotor assembly relative to a stator assembly;
minimizing back electromotive forces intermediate the rotor and stator assemblies for enabling higher speed-lower force linear actuation;
loading a thrust member of the rotor assembly;
axially centering the rotor assembly relative to the stator assembly; and
maximizing back electromotive forces intermediate the rotor and stator assemblies for enabling lower speed-higher force linear actuation.

26. The actuation method of claim 25 comprising the step of governing axial rotor assembly displacement while loading the thrust member.

27. The actuation method of claim 25 comprising the step of axially extending the thrust rod before loading the thrust member.

28. The actuation method of claim 27 comprising the step of relaxing the thrust member while axially offsetting the rotor assembly relative to the stator assembly.

29. The actuation method of claim 28 comprising the step of axially retracting the thrust rod before relaxing the thrust member.

* * * * *